US009905079B2

(12) United States Patent
Mills

(10) Patent No.: US 9,905,079 B2
(45) Date of Patent: Feb. 27, 2018

(54) SYSTEMS FOR SHOWING MOVEMENT OF ICONS ALONG A PATH

(71) Applicant: IGT UK INTERACTIVE LIMITED, London (GB)

(72) Inventor: Joanne Louise Mills, Basingstoke (GB)

(73) Assignee: IGT UK INTERACTIVE LIMITED, London (GB)

( * ) Notice: Subject to any disclaimer, the term of this patent is extended or adjusted under 35 U.S.C. 154(b) by 80 days.

(21) Appl. No.: 14/966,367

(22) Filed: Dec. 11, 2015

(65) Prior Publication Data

US 2016/0171818 A1 Jun. 16, 2016

Related U.S. Application Data

(60) Provisional application No. 62/091,287, filed on Dec. 12, 2014.

(51) Int. Cl.

| | |
|---|---|
| ***A63F 13/00*** | (2014.01) |
| ***G07F 17/32*** | (2006.01) |
| *G07F 17/34* | (2006.01) |

(52) U.S. Cl.

CPC ............ *G07F 17/326* (2013.01); *G07F 17/34* (2013.01)

(58) Field of Classification Search

None

See application file for complete search history.

(56) References Cited

U.S. PATENT DOCUMENTS

| | | | | |
|---|---|---|---|---|
| 8,900,045 | B2 | 12/2014 | Garretsen et al. | |
| 2004/0137981 | A1* | 7/2004 | Gauselmann | G07F 17/32 463/20 |
| 2006/0148553 | A1* | 7/2006 | Dodge | G07F 17/323 463/20 |
| 2007/0173307 | A1* | 7/2007 | Aida | G07F 17/34 463/16 |
| 2008/0039184 | A1* | 2/2008 | Inamura | G07F 17/34 463/20 |
| 2008/0300037 | A1* | 12/2008 | Wilson | G07F 17/3265 463/16 |
| 2009/0082087 | A1* | 3/2009 | Pacey | G07F 17/34 463/20 |
| 2009/0111566 | A1* | 4/2009 | Naicker | G07F 17/32 463/20 |
| 2013/0143638 | A1* | 6/2013 | Nakamura | G07F 17/34 463/20 |

* cited by examiner

*Primary Examiner* — Jason Yen

(74) *Attorney, Agent, or Firm* — Sage Patent Group

(57) ABSTRACT

Provided systems include a display that presents a player with icons. The display is animated to show movement of the icons along a path. The icons move in and out of active and inactive regions on the display and the path, based on the shape and arrangement of the active and inactive regions and the shape and arrangement of the active and inactive portions of the path. The outcome is determined based on the position and arrangement of the icons on the display and the path. The system receives player instructions and game outcomes may be random or may be predetermined. An outcome for the game may be determined from a set of potential game outcomes and visually presented to the player and an associated award or prize may be provided to the player.

32 Claims, 6 Drawing Sheets

SYSTEMS FOR SHOWING MOVEMENT OF ICONS ALONG A PATH

RELATED APPLICATIONS AND PRIORITY CLAIM

This application claims the benefit of and priority to U.S. Provisional Patent Application No. 62/091,287, filed Dec. 12, 2014, the disclosure of which is expressly incorporated by reference herein.

FIELD OF THE INVENTION

The disclosure relates to systems and methods for electronic entertainment machines. In particular, systems and methods for providing and displaying an electronic game to a player are disclosed. The systems and methods involve animated icons that move along a path on an electronic display where the game outcome is determined based on the arrangement and appearance of icons on the path.

BACKGROUND

Video slot machines randomly select and display symbols to a player and then grant awards to a player based on the occurrence of certain symbol combinations and patterns appearing on the display screen.

What is desirable, for both the player and the game machine owner or operator, are new game machines and methods that provide novel games and ways to play so as to increase player interest and enjoyment over previously known machines and methods resulting in longer and more frequent game play. These game machines and methods will generate increased revenue through increased play of the gaming machine.

SUMMARY

New systems and methods for handling and presenting game play, for instance for a wagering game, are provided herein. In certain embodiments, the systems and methods provide increased player interaction in real-time. The increased player interaction leads to increased player interest and enjoyment and increased game play volume. The systems and methods provide an electronic display showing a path along which a stream of animated icons are made to move. The path may or may not be made visible. Preferably the path is sized so that only a single icon can pass at any given time, so that, for instance, the icons move along the path similar to the way that train cars move along a train track. The path is preferably a winding path, so that the icons may appear adjacent to other icons at different portions of the path. Pay lines may be provided over the path so that combinations of icons appearing along a pay line result in a win or a prize for the game player. For instance, a pay line may cross the path at adjacent points. A win may provide player with, for instance, monetary prizes, multipliers, game credits, free spins or other awards in the game.

The game outcome may be determined based on the arrangement and appearance of the icons on the display. For instance, the game outcome may be determined or dependent upon a particular arrangement of game icons lining up along the path, for instance at adjacent locations along the path. Additionally, or alternatively, the actual game outcome may be predetermined and the presentation of the outcome may be selected after determination of the game outcome, for instance, the presentation of the outcome may be selected from among a set of outcome presentations to match the determined actual game outcome. Alternatively, the outcome presentation may be made to fit a determined or predetermined actual game outcome.

In one embodiment, a gaming system is provided with a programmed controller; a player input device to receive player selections from a player and to provide the player selections to the controller; a memory; and an electronic display for displaying a wagering game and providing communications to a player. The controller is operative to receive player inputs from the player input device and to cause the display to present a plurality of icons and other game graphics and information on a display screen, for instance in an animated.

In one embodiment, the controller is configured to cause the display to show the icons so that they appear at different positions along a predefined curving path and to animate the display to show a plurality of the icons moving along the path. The controller is also configured to stop the game play and animation and the movement of the icons along the path after a predetermined or randomly determined time period or in response to receipt of an instruction from the player input device. Upon stopping the play, the controller may determine whether the icons are arranged in a way that results in a win in the game. Alternatively, the outcome may be predetermined and the controller may ensure that the arrangement of the icons appearing on the screen matches the predetermined outcome, for instance, by timing the actual stoppage of play. The controller may also select or determine an outcome for the game from a set of a plurality of potential outcomes, and cause the display to present the award assigned to the determined outcome for the game.

Upon stopping the play, the controller may, alternatively or additionally, display over the path a plurality of potential paylines and, optionally, highlight any winning paylines.

In one embodiment, the display is a touch sensitive display and the display serves as the player input device.

The display screen may visually present the plurality of icons along a path. In certain embodiments at the beginning of the game the path may be empty, that is, devoid of any icons. Alternatively, at the beginning of the game the path may be partially or entirely filled with icons. The controller may cause a plurality of icons to be streamed onto the path from an entry point on the display, and cause the display to move the icons along the path, with each icon passing different points along the path one icon at a time. The controller causes the icons to move along the path for a predetermined or randomly determined amount of time, or until a player indication to stop the icons is received at the controller from the player input device.

The appearance and identity of each icon or symbol may be predetermined or may be randomly determined. Additionally or alternatively, sets of icons may be determined rather than individually determining each icon and the sets of icons may be randomly determined or they may be predetermined. In certain embodiments the appearance and/or identity of each individual icon will not change during the game. Alternatively, the controller may cause the appearance and/or the identity of any or all of the icons to change during the game. In one embodiment the icons appear in the form of balls in a number of different colors and the differently colored balls may also show different symbols or other icons for instance a shape, such as a triangle, circle, or rectangle, or any other suitable icon configuration, including complex or intricately illustrated icons.

The controller may also receive, from the player input device, player instructions to start or stop the game, indications of wager amounts and other player instructions or selections, for instance, selections of one or more icons. The controller may also select or determine an outcome for the game, for instance from a plurality of potential outcomes; and cause the display to present the award assigned to the determined outcome for the game. In such an embodiment the outcome may be determined randomly or through a pseudo random outcome generation process.

The controller may determine, for instance in a random or pseudo random determination process or mechanism, the selection of icons, the appearance of the icons as well as the manner in which the icons are animated. Additionally, the controller may determine in a random or pseudo random determination process or mechanism the number of icons that appear in a given time period and how far and quickly the icons move along the path. For instance, the icons may move at varying speeds along the path and/or a player input may be used to directed the speed of icon appearance and movement on the display.

Optionally, the awards associated with a win in the game may depend on the arrangement and/or the appearance of the icons in the path. For instance, a line of several icons of one particular type may be awarded a different amount than a line of several icons of a different type. The award may also vary depending on the number of symbols or icons that match or the type of payline involved, for instance a vertical vs. a diagonal or whether the win involves only natural icons or additionally includes one or more "wild" icons that can serve as any of the icons to form a match. For instance, a paytable for a game may include a larger award for a payline with five symbol matches, a lesser award for four symbol matches, and an even lesser award for three symbol matches. Optionally, the award associated with a round of game play may be predetermined, for instance at the time a player enters or indicates a wager or even before the player provides an input to the gaming machine. Optionally, the award may be determined randomly during game play, or for instance after some event such as a player pressing a start button or in the event that a pool of predetermined outcomes begins to be depleted or is emptied.

Thus, in accordance with these systems and methods, a game player is provided an animated display presenting a new way to play and win a wagering game. The game system game may determine an actual game outcome from a set of potential outcomes and present the game outcome to the player and provide the associated prize or award.

It should be appreciated that certain of the systems and methods described herein could be provided in a primary game or a bonus game.

Thus, in certain embodiments, particular graphical effects are animated and shown in response to player selections and/or game events. In particular, the player may select an icon set or theme; the speed of icon appearance and movement; a start button or input, to start icon animation and movement; and a stop button or input, to stop icon animation and movement. Another example is an animation showing the pay lines and the presentation of a win or a loss as well as any associated prize. In certain embodiments, the display may be animated to show a player selection of one or more pay lines.

Another embodiment involves a computer program stored on a non-transitory readable medium, for instance a computer readable medium. The software version may be configured to be executed by a gaming machine or networked gaming system. The software may include multiple portions of computer executable or source code referred to as program code. Gaming outcomes are provided in response to wagers and player inputs and the gaming outcomes may be displayed by display program code that causes an electronic display to show the gaming outcome visually. The gaming outcomes may, in whole in or in part, be predetermined, or received by a networked game controller, or may be determined based on a random or pseudo-random output generator, or may be determined based on one or more player inputs, or a combination of the foregoing. The program may also have game controller program code for determining game play results including random or pseudo random outcome generators, and for providing the game play and outcomes and their animations.

Another embodiment involves a gaming system including one or more gaming servers, and a group of electronic gaming machines connected to the servers by a network. The various functionality described herein may be distributed between the electronic gaming machines and the gaming servers in any practically functional way. For example, in one architecture the servers provide the game logic, random number generation, and outcome selection. The gaming machines provide interfacing with the player and animating the game results to present the outcome received from the server in an entertaining manner. However, other embodiments of course might use a thin client architecture in which the animation is also conducted by the server and electronic gaming machines serve merely as a terminal to receive button or touchscreen input from the player and to display graphics received from the server.

The different features described herein may be included in different versions, consistent with the spirit and scope of the disclosure provided herein. Other objects, advantages and novel features of the present invention will become apparent from the following detailed description of the invention when considered in conjunction with the accompanying drawings.

BRIEF DESCRIPTION OF THE FIGURES

Certain embodiments of the invention are illustrated in the Figures of the accompanying drawings in which.

DETAILED DESCRIPTION

For simplicity and illustrative purposes, the principles of the present invention are described by referring mainly to various exemplary embodiments thereof. Although the preferred embodiments of the invention are particularly disclosed herein, one of ordinary skill in the art will readily recognize that the same principles are equally applicable to, and can be implemented in other systems, and that any such variation would be within such modifications that do not part from the true spirit and scope of the present invention. Additionally, it is contemplated that various features of the embodiments disclosed herein may be combined. Before explaining the disclosed embodiments of the present invention in detail, it is to be understood that the invention is not limited in its application to the details of any particular arrangement shown, since the invention is capable of other embodiments. Throughout this description, certain acronyms and shorthand notations are used. These acronyms and shorthand notations are intended to assist in communicating the ideas expressed herein and are not intended to limit the scope of the present invention. Other terminology used herein is for the purpose of description and not of limitation.

Figure 1:
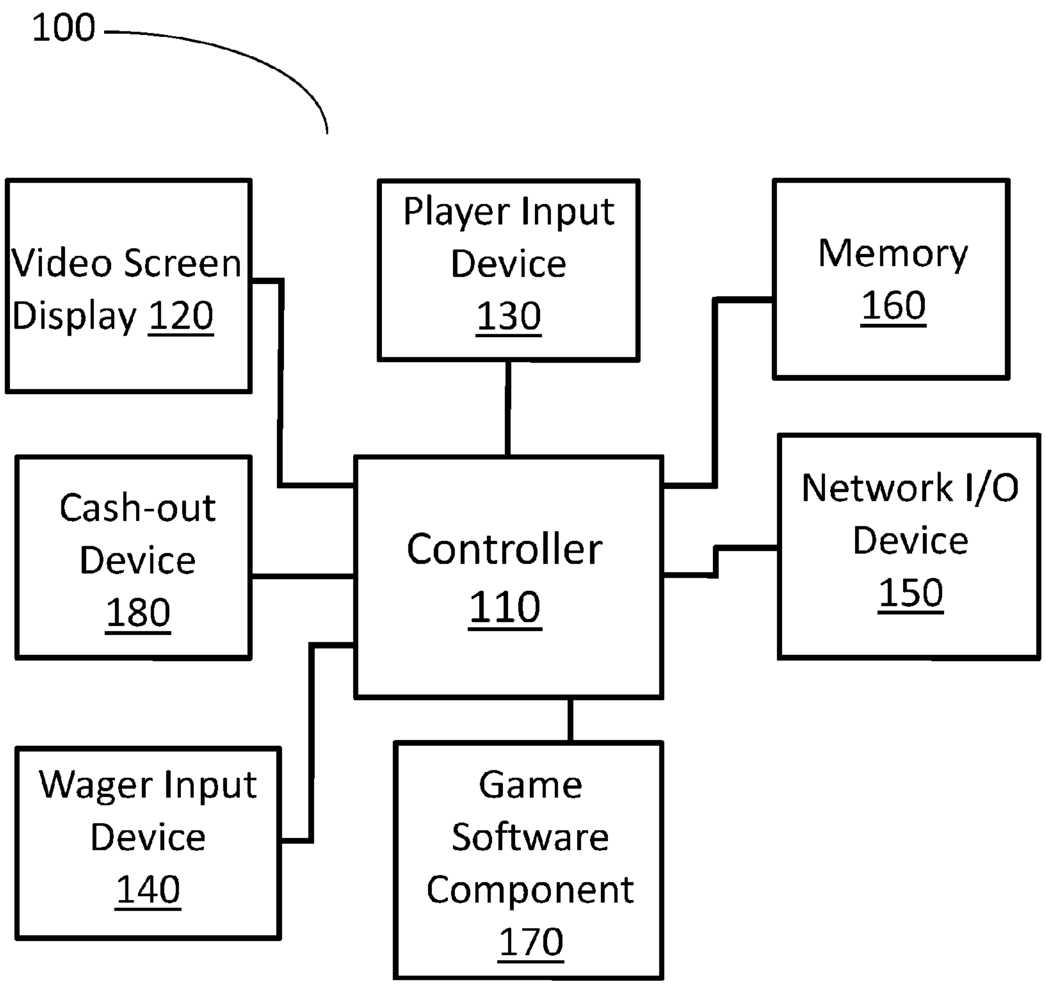
FIG. 1 is a block diagram showing components of a game machine according to one embodiment.

FIG. 1 provides a block diagram of an example game machine, according to an example embodiment of the present invention. Game device 100 may be a terminal in a distributed system (not shown). Game device 100 has a controller 110 in communication with several peripherals. Game device 100 includes at least one a video screen display 120. The video screen display 120 may be used to show the operation and results of a round of the wagering machine game (e.g. show the movement of icons and their stopping position so that a player can see the game being played and the result). There may be an input device 130, which may be any device which allows the gaming device 100 to accept input from the user, for example, a conventional keyboard, a keypad, a joystick, a mouse, a number of buttons, a touch-sensitive display, a slot machine lever or arm, or a combination of the foregoing. The input device 130 and the video screen display 120 may be combined, for instance in the case of a touch-sensitive screen. The gaming device 100 may also include a wager input device or reading device 140. The reading device 140 may be designed, for example, to accept paper bills, or other slips detailing credit, or may be a device which reads magnetically or electronically stored information. For instance, the reading device 140 may read and/or verify a credit or debit account from a credit or debit card or other voucher. Optionally, the reading device 140 may serve as a player tracking card reader, a ticket reader, a banknote detector, a coin detector, or any other input device that can read an instrument supplied by the player for conveying a monetary amount. In the case of a tracking card, the system detects the player's available funds and applies that amount or a selected portion of that amount to the gaming machine being played. The reading device 140 may be an optical reader, a magnetic reader, or other type of reader. A slot may be provided in the gaming machine for receiving the instrument. Additionally, wagers, funds or credits may be transferred electronically for instance, wirelessly with RFID, WiFi, Bluetooth, NFC, tap smart or other processes for instance based on bank account or credit, debit or loyalty card accounts.

The game device 100 may also include a network I/O device 150. The network I/O device 150 may be, for example, a serial port which may connect to a network or telephone line. Alternatively, the network I/O device 150 may be a wireless communications device. The game device 100 may also include memory 160 to store the various graphics and instructions required to operate video screen display 120. Additionally, there may be a game software component 170 including terminal interface instructions allowing the terminal to interface with a distributed system or network, in conjunction with the network I/O device 150 or separately. A cash-out device 180 may also be provided to either payout winnings directly to a player or to provide a payment voucher that the player may exchange for cash or other credits at a cashier.

The controller or processor 110 may include any combination of hardware, software, and/or firmware that may be disposed or provided inside and/or outside of the gaming device 100 that may communicate with and/or control the transfer of data between the gaming device 100 and a bus, another computer, processor, device, service, or network. The controller 110 may include one or a plurality of controllers or processors. The controller 110 in the gaming device 100 may include a CPU, and may alternatively include a CPU in combination with other components, such as I/O circuits and system memory. The controller 110 may reside partially or entirely inside or outside of the device 100.

The network I/O device 150 may connect to an external system such as a gaming network or the Internet (not shown). The external system may include a gaming network, the Internet, other gaming machines, a central controller, a gaming server or other communications hardware and software systems and components.

The game device 100 may communicate with external systems (via hard wires or wirelessly) so the device 100 operates as a "thin client," having relatively little functionality, a "thick client," having relatively more functionality, or at a level of functionality therebetween. As a generally "thin client," the gaming device 100 may operate primarily as a terminal or display device to display the results of gaming outcomes processed externally, for example, on a server as part of networked or external system. In this "thin client" configuration, a central server or controller (which may be referred to as a host system) may execute game software code and determine game outcomes (e.g., with a random or pseudo-random number generator), while the controller 110 on board the gaming machine processes display information to be displayed on the display(s) of the device 100. In an alternative "thicker client" configuration, an external server (known as a host system) determines game outcomes, while the controller 110 on the gaming device 100 executes game code and processes display information to be displayed on the display(s) of the machines. In yet another alternative "thick client" configuration, the controller 110 on the gaming device 100 executes game code, determines game outcomes, and processes display information to be displayed on the display(s) of the machine. Numerous alternative configurations are possible such that these and other functions may be performed within or external to the gaming device 100 as may be necessary or desirable for particular applications.

It should be understood that the gaming devices 100 may take on a wide variety of forms such as a free standing machine, a portable or handheld device primarily used for gaming, a mobile telecommunications device such as a mobile telephone, smart phone or personal daily assistant (PDA), a counter top or bar top gaming machine, or other personal electronic device such as a tablet, personal computer, laptop, or other entertainment device.

Figure 2:
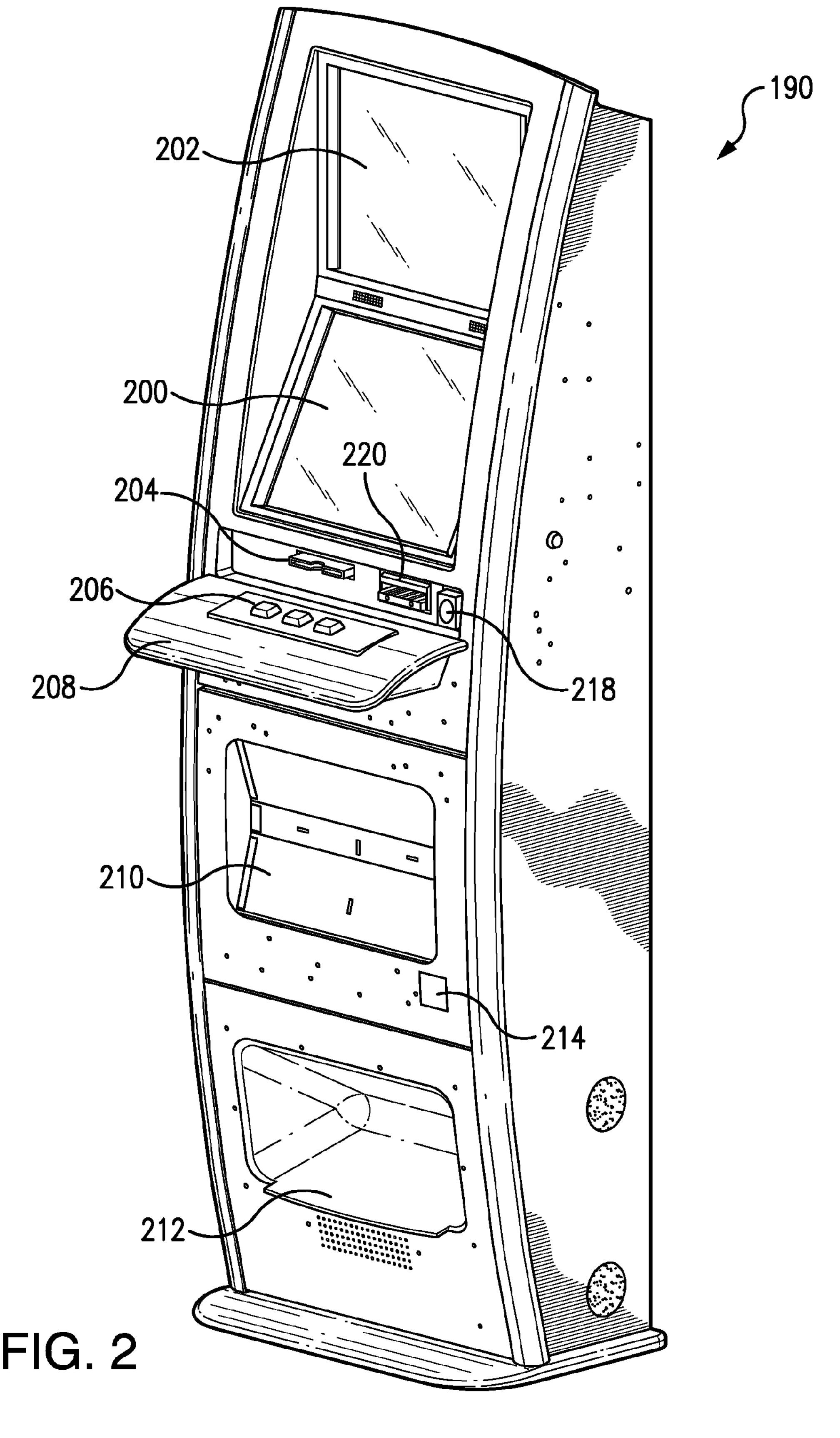
FIG. 2 is a perspective view of a game machine according to one embodiment.

FIG. 2 depicts an exemplary game machine or terminal, according to an example embodiment of the present invention. The video game terminal 190 provides a payout based on a wager and the results of the game. Alternatively, the video game terminal 190 may be configured to provide a game of chance, a lottery game, or another game to the player. For example, the game provided may be played on a display screen. The video game terminal 190 of FIG. 2 includes an upper screen 202 and a display screen 200. The upper screen 202 and display screen 200 may be configured to display information to the player. For example, the upper screen 202 and the display screen 200 may be a film transistor (TFT) display, a liquid crystal display (LCD), a cathode ray tube (CRT), an organic light emitting diode display (OLED) or any other type of suitable display screen. Optionally, the upper screen 202 and the display screen 200 may be touch sensitive display screens, allowing a player to input choices by touching areas on the screens. Alternatively, the upper screen 102 and the display screen 100 may be a cathode ray tube (CRT) screen or any other type of display screen for instance an organic light emitting diode (OLED) screen. In one embodiment, the actual game play is shown on display screen 200 and the upper screen 202 may be used to provide game identification and other game related information such as paytables, jackpot amounts, recent winnings, game logos or other advertising or information as desired by the game owner or operator.

The video game terminal 190 may include a ticket dispenser 204. The ticket dispenser 204 may be configured dispense a ticket. For example, the ticket may be a lottery game ticket. Alternatively, the ticket may be a prize ticket or voucher redeemable for a prize or any other type of ticket. For example, the ticket may be printed on heavyweight paper. A printer (not shown) may be provided with the ticket dispenser 204.

The video game terminal 190 may include a set of play buttons 206. The play buttons 206 may be configured to accept player input. For example, the play buttons 206 may be used by the player to interact with the wagering game by receiving selections from the player and providing the selections to the wagering game. For example, the player may select a game to be played, a wager amount to be made, and responses to choices provided by the wagering game.

The video game terminal 190 may include a fingerboard 208. The fingerboard 208 may serve as a hand rest for the player while playing the wagering game. The video game terminal 190 may also include a bottom graphics area 210. The fingerboard 208 and the bottom graphics area 210 may include printed graphics that attract player attention to the game or other visual designs. The fingerboard 208 and the bottom graphics area 210 may also include printed information, such as game information or prize information.

The video game terminal 190 may include a foot rest 212. The foot rest 212 may be configured to accept the player's feet in a resting position while playing at the video game terminal.

The video game terminal 190 may include a coin dispenser 214. The coin dispenser 214 may be configured to dispense coins. For example, the coin dispenser 214 may dispense coins as change for a player's wager or a player's winnings. Alternatively, the coin dispenser 214 may be replaced with, or provided in addition to, a ticket dispenser. A player's winnings may be dispensed as a ticket which may later be redeemed at a cashier.

The video game terminal 190 may include a coin acceptor 218. The coin acceptor 218 may be configured to accept a coin. For example, the coin may be legal tender in the form of a coin or legal tender equivalents, such as tokens provided by a gaming establishment.

The video game terminal 190 may include a bill acceptor 220. The bill acceptor 220 may be configured to accept a legal tender in the form of a bill. Alternatively, the bill acceptor 220 may be configured to accept legal tender equivalents, such as bills provided by a gaining establishment. Alternatively, the bill acceptor 220 may be configured to accept a magnetic card. For example, the magnetic card may include a currency-equivalent balance. Alternatively, the bill acceptor may be configured to accept and/or read other currency-equivalents such as credit cards, debit cards, and the like.

The embodiments described herein involve numerous hardware components such a video game system (such as the video game terminal 190 of FIG. 2 or the game device 100 of FIG. 1), computing devices, processors, memory, input and output devices, displays, networks, electronic gaming terminals, and networked systems including these components. These components and the combinations thereof may be configured to perform the various functions described herein. Accordingly, the embodiments described herein are directed towards electronic machines and connected systems that are configured to process and transform electromagnetic signals representing various types of information. The embodiments described herein pervasively and integrally relate to machines, systems, and their uses; and the embodiments described herein have no meaning or practical applicability outside their use with computer hardware, machines, various hardware components, and connected systems, as appropriate.

Substituting the video game system, computing devices, processor, memory, and display for non-physical components, using mental steps for example, substantially affects the way the embodiments work, likely rendering them inoperable.

The computer hardware components and other features are essential elements of the embodiments described herein, and they cannot be omitted or substituted with mental means without having a material effect on the operation and structure of the embodiments described herein. The computer hardware is essential to the embodiments described herein and is not merely used to perform steps expeditiously and in an efficient manner.

Figure 3:
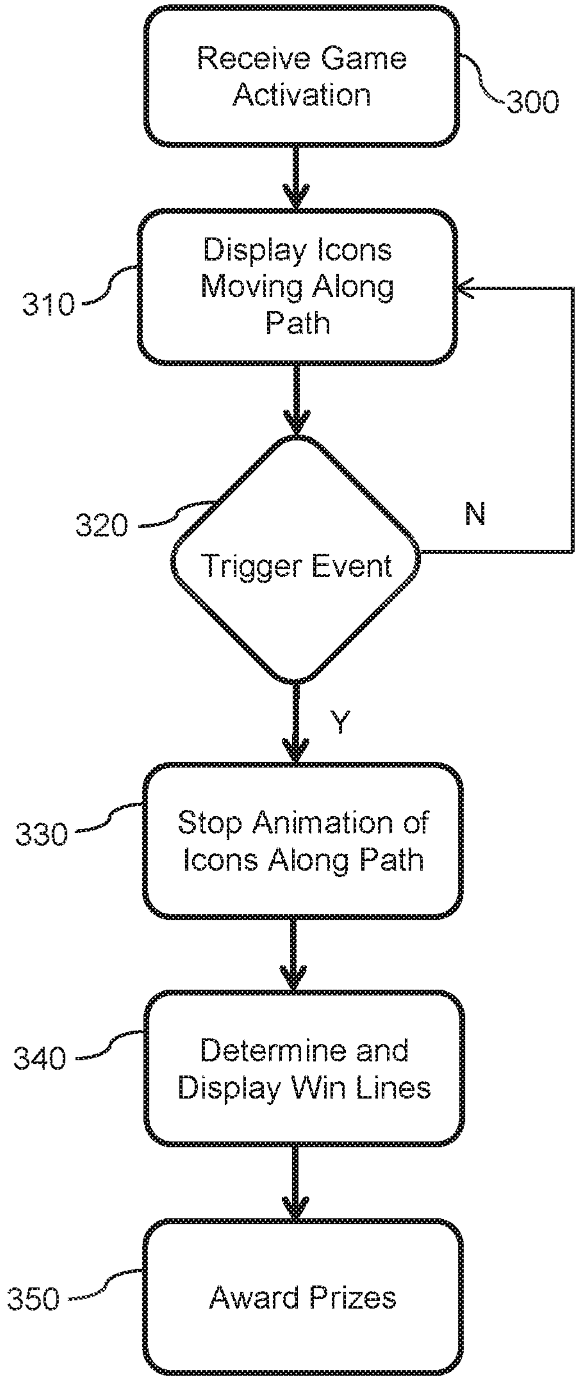
FIG. 3 is a flowchart of various steps performed by the processes and systems described herein.

FIG. 3 is a flowchart that shows steps of a process that may be performed in accordance with certain embodiments and systems of the invention. The method is performed by the video gaming system, using hardware components of the video game system. Referring to FIG. 1, the controller 110 may be a suitably programmed processor that is configured to perform the functions described herein, working, for instance, with the game software component 170. More particularly, a controller, such as a processor, is configured to perform the method of FIG. 3. In one embodiment, the controller receives a player game activation 300. This may be in the form of receipt of a wager entry or receipt of a player indication that the player desires to play the game. For instance, the received player indication may be in the form of a touch indication to a touch-sensitive display screen or depressing a button or other input on a game console. Prior to receipt of the player indication the controller and display may be in an inactive or active state. The controller receives the player input and then starts the presentation of the game by animating the display to show a plurality of icons moving along a path in a gaming zone on the display screen 310. This animation continues until occurrence of a trigger event.

Responsive to occurrence of a trigger event 320, the animation of the icons along the path is stopped 330. The trigger event 320 may include introducing a predetermined number of icons onto the display screen for instance, 3, 5, 7 or more icons. The number of icons may be predetermined or may be randomly determined. Additionally, the identity of the icons may be predetermined or randomly determined. The trigger event 320 may also include receipt of an instruction from a player input device or from the screen in the case of a touch sensitive screen, for instance, a stop instruction. The trigger event 320 may also include a randomly determined stop event or a predetermined stop event such as a randomly or predetermined amount of time passing. The trigger event 320 may also be received from a networked game controller that is in electronic communication with the game machine, though not physically a part of the game machine itself. If a trigger event 320 is not detected, then the process continues to show the animation of the icons along the path.

The animation may be stopped slowly or quickly. For instance, responsive to a trigger event, the animation may begin slowing and eventually stop to allow the animation to proceed to present a predetermined outcome. This may, for instance, permit the presentation on the display to make it appear that the player controlled or had an input on the game outcome. In such an embodiment, the movement of the icons or symbols may slow down to the point that icons or symbols reach an arrangement where they stop in a position that meets the predetermined outcome, for instance a match across one or more pay lines. Alternatively, the trigger event may be a timeout, for instance, a duration of time passing with no player input.

Once the animation of the icons along the path is stopped 330, any applicable win lines may be determined and animated or displayed 340. In certain embodiments, the result is predetermined so that the win lines can be displayed without any determination as to the presence or absence of win lines.

Subsequently, any applicable prizes can be awarded to the player 350. The prizes may include monetary prizes, multipliers, game credits, free spins or other awards, or entry of a bonus game, which may be the same game or a different game. For instance, the base game may award a free spin bonus as a prize in the event of a winning pattern result from the symbols.

Figure 4:
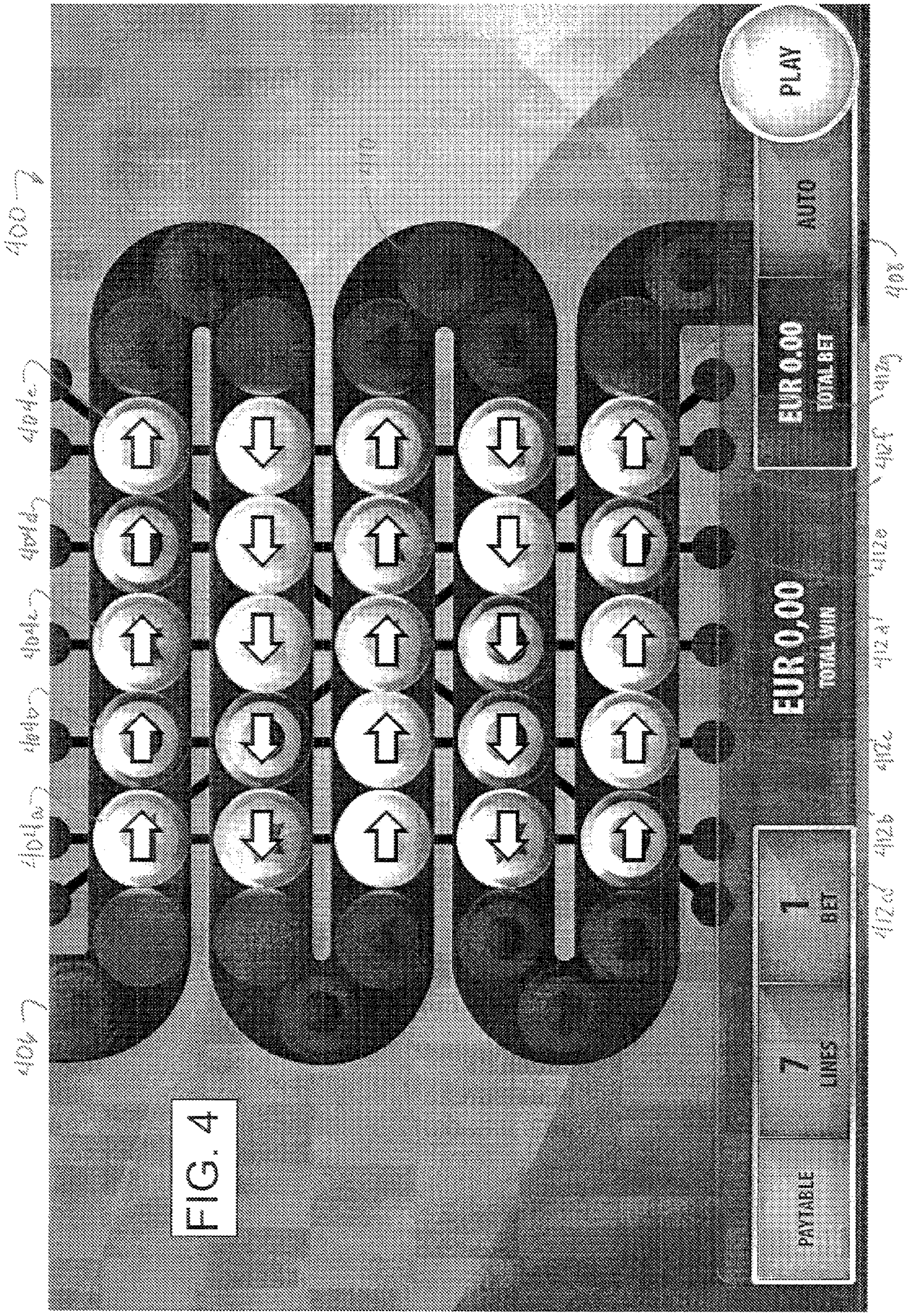
FIG. 4 shows an example screenshot of a display 400 showing an example game.

FIG. 4 shows an example screenshot of a display 400 showing an example game with a path 402. As shown, a number of icons or symbols, for instance icons 404*a-e*, are positioned on the path 402. The path 402 winds back and forth on the display 400 and the path has an entry region or point 406 and an exit region or point 408 where the icons enter or exit the display 400, respectively. In FIG. 4, the icons that are in play are lighter than the icons which are not in play, for instance icon 410 is not in play. Thus FIG. 4 shows a zone having icons that are currently in play, as well as zones where icons are currently not in play. As new icons enter the screen each of the icons moves along the path 402 and icons will also leave the screen at the exit region or point 408. Thus, the icons or symbols are animated to give the appearance of the icons or symbols moving along the path 402, much the same way train cars will move along a train track. Arrows are drawn in over each of the currently active icons which show that the set of currently active icons form an array, in this instance a 5×5 array. Of course, different size arrays are possible as well as different arrangements of the path 402 on the screen 400. The icons having an arrow drawn over them also represent a regions or zone of active icons, while the icons lacking the arrow are in inactive regions or zones along the path. If the icons were animated, for instance, to move along a distance approximating one icon, then some of the active icons would become inactive as they would move outside of the region or zone making up the currently active icons, while other icons would move from an inactive region on the path 402 to an active region on the path 402. In the drawings, the drawn-in arrows, which may not typically appear on the display 400 in an actual implementation of the game, point in the direction of movement for each of the active icons. Thus, it can be appreciated that adjacent portions of the path 402 have icons moving in opposite or different directions.

FIG. 4 also shows seven potential winlines 412*a-g* on the 5×5 array, including five vertical winlines 412*b-f* and two diagonal winlines 412*a* and 412*g*. In FIG. 4, the winlines 412*a-g* are shown as lines with balls at each end of the line. Wins may occur when matching icons appear along one or more winlines. In certain embodiments, a controller causes the display to show the potential winlines before, during and/or after a game, the latter being, for instance, when a game result is displayed.

Thus, in one embodiment, systems and methods are provided where a display is caused to show colored balls rolling through tubes or along a path and wins are achieved if like colored balls line up, for instance lining up in adjacent parts of the path.

Figure 5:
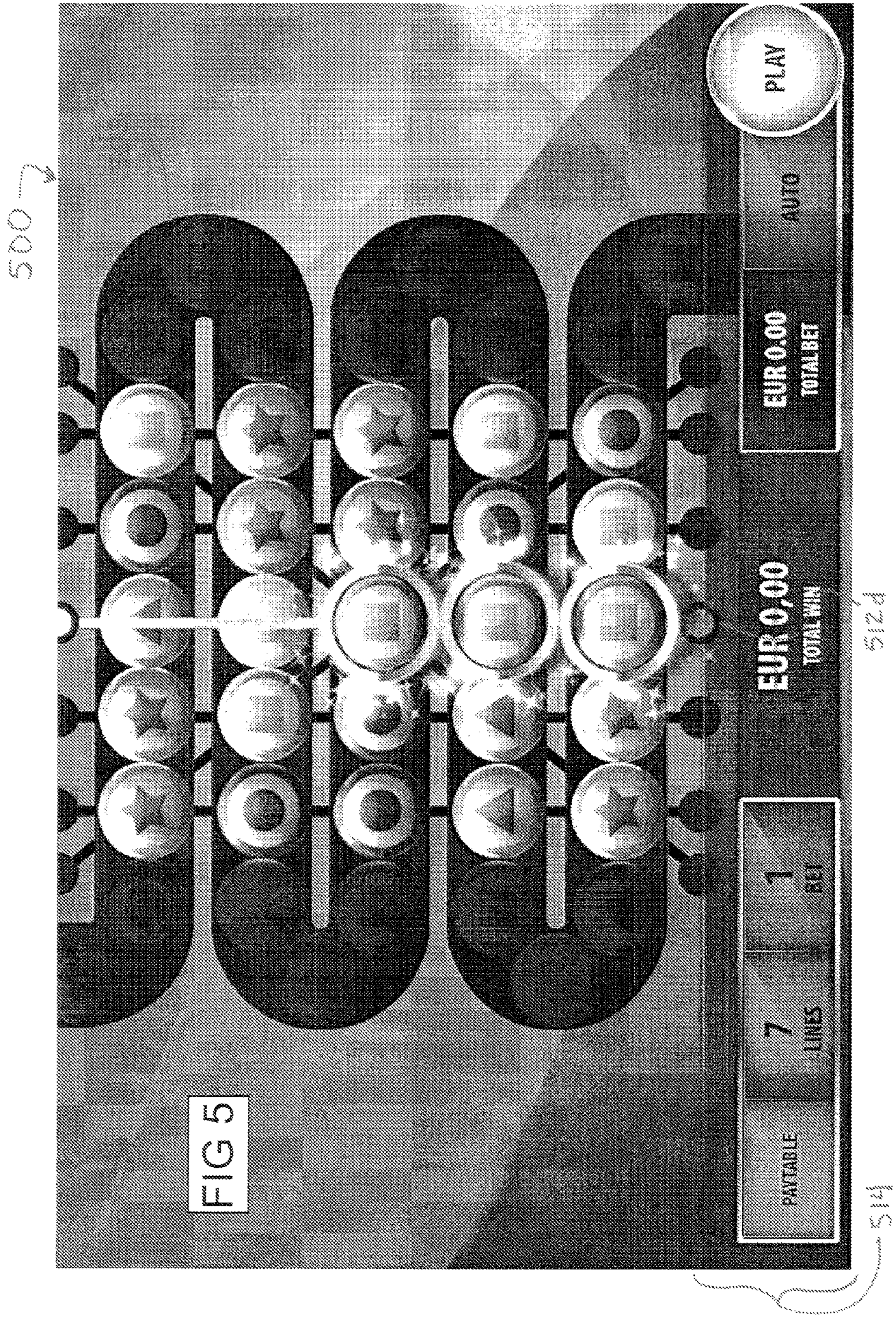
FIG. 5 shows an example screenshot of a display 500 showing an example game.

FIG. 5 shows another example screenshot of a display 500 showing an example game with a path 502. The arrows drawn in to FIG. 4 are not shown in FIG. 5 and various exemplary symbols appearing on the icons are more clearly depicted. Any suitable set of icons or symbols may be used in the game, for instance different shapes, colors or other symbols, for instance, symbols associated with playing cards or with traditional slot machine games, such as fruits. Alternatively or additionally, the icons may appear as a single shape, for instance balls as shown in FIG. 5, along with different images appearing on the balls, for instance, stars, triangle, circles, squares, etc. In addition to icons, symbols or balls, the icons could take the form of casino chips, gemstones, coins, bubbles or other suitable icons.

In one embodiment, instead of having the icons appear to roll onto the screen along the path or tube, the game result could simply flash in, for instance so as to facilitate faster play of game rounds.

As depicted in FIG. 4, FIG. 5 shows an active zone or region where the icons that are currently active are positioned. Inactive zones or regions appear to the right and left sides of the active zone or region, denoting areas along the path 502 where the icons in those zones or regions are not part of the set of currently active icons or symbols. As can be appreciated from FIG. 5, movement of the icons along the path 502 causes some of icons to change status from inactive to active or from active to inactive. Thus, the path 502 winds across the screen 500 in a configuration so that the path and the screen 500 includes inactive and active regions or zones.

FIG. 5 also shows a match of three icons with square symbols along payline 512*d*. FIG. 5 depicts that the graphics animate and the highlight winning payline 512*d* with stars. Additional colors and animation can be used to further highlight a winning payline. As shown in FIG. 5, there is a win in this game result even though only three out of five icons matched along the payline. Additionally, the win may be achieved wherever there are adjacent matches along a payline.

Also shown in FIG. 5 is an information and control region 514 near the bottom of the display 500. The information and control region 514 is useful to display information about the game or current selections or settings. For instance, in FIG. 5, the information and control region 514 shows the number of potential winlines or paylines, the current bet and other useful information. Additionally, the information and control region 514 may provide touch sensitive buttons that may receive a player touch to indicate a player control or selection. For instance, in FIG. 5, the player may select to see a paytable, to place a bet, or to start the game by touching the "PLAY" region.

Additionally, the display may only show the winlines in response to a player input to show the winlines or after the game animation showing movement of the icons has stopped. Alternatively, the display may show the winlines throughout the animation and after stopping the game.

The game may be provided with a shuffle feature where all or some of the icons may be moved around to different positions on the path to provide a new game outcome. For instance the system may receive a selection of icons to be shuffled from a player input or the system may select a number of icons to move to new positions on the path, for example selecting the one or more icons randomly. The selection and movement of icons may be such that some icons move from an inactive zone to an active zone and/or from an active zone to an inactive zone along, the path.

The game may also provide a replace feature where one or more icons are replaced with different or the same icons. The icons to be replaced and the icons serving as the replacements may be randomly determined or may be determined by a player input, or a mixture of both.

The game may be provided with a freeze feature where one or more of the icons are selected and frozen in their position for a subsequent spin or during a current spin so that movement of the one or more icons along the path 502 is stopped. The unselected icons may then be animated to skip over or move around the frozen icons. Selection of the icons for the freeze feature may be similar to the process described above for the shuffle feature.

The game may be provided with a wild feature where one or more icons are selected as wild and/or a special wild symbol may be provided. The wild symbol acts as any symbol necessary to make a match or form a winning arrangement with other nearby symbols. In one embodiment where balls are used as the icons or symbols that move along the path, a rainbow ball having a variety of different colors may serve as a wild ball, resulting in a win if the rainbow ball is adjacent to other balls that result in a match. For instance, a player may be permitted to insert a number of wild icons in place of the icons naturally appearing during or at the end of a game. This could significantly alter the outcome of the game.

The game may be provided with a freespins feature where a predetermined or randomly determined number of free spins are provided to a player. The freespins allow a player to play one or more additional rounds of the game, without making additional wagers or with reduced wagers.

The game may be provided with a cascade feature where one or more icons are selected to be removed. For instance all of the icons sharing a similar property such as color may be removed from the path and new icons are then allowed to move through the path to fill in the empty spaces resulting from removal of the old icons. This feature may be presented in the form of a destructoball, where the appearance of the destructoball causes all of the icons or symbols having the color or symbol of the destructoball to be animated to explode, allowing the remaining balls to cascade down the path and new balls enter the path.

The game may be provided with a magnoball feature where the icons or symbols are provided in the form of colored balls. The magnoball changes the color of the balls nearby it, for instance during animation and/or when the animation and movement of the balls stops. The result is that the location and presence of the magnoball may result in a win where one might not otherwise have occurred. In one embodiment, the magnoball changes the color, symbol or other appearance of each of the 8 balls nearest the magnoball. In one embodiment, the magnoball changes the color, symbol or other appearance of all of the balls in the same row as the magnoball. In another embodiment, the magnoball changes the color, symbol or other appearance of each of the 4 balls directly above, below, and to the right and left of the magnoball. Either the magnoball or the destructoball feature described above may be provided in the form of symbols or icons other than balls.

The game may be provided with a nudge feature where after the symbols or icons stop the system may receive an instruction from the player to move the region having the active icons to the left or right to change the set of active icons, possibly resulting in a win. For instance, the controller may cause the display to show that the region having the active icons is moved approximately one icon to the left, so that a new set of icons becomes active in the column on the left and a set of icons in the column on the right becomes inactive. In this way, the game allows a way to adjust the first outcome from movement of icons along the path into a second outcome, taking into account the movement of the active region along the path region and display screen. Additionally, the nudge feature may operate to expand the region having the active icons both to the left and the right, so that, for instance, if the original active region were a 5×5 array of icons it would become a 7×5 array of icons.

In certain embodiments, the game may be proceed and after displaying a game result to a player, the player may be offered the opportunity to use the shuffle feature, the replace feature, the freeze feature, the wild feature, the freespins feature, the cascade feature, the nudge feature, the magnoball feature, the destructoball feature, or a combination of these features. These features may be triggered by, for instance, a winning result or a series of winning results or a series of losing results. The features may also be triggered randomly or after a predetermined or otherwise determined number of rounds of game play or after a predetermined or otherwise determined duration of playing time. In an embodiment with one or more of these features, the controller may instruct the display to offer the player one or more of these features, and, responsive to a player input indicating a selection of one or more of the features, the controller may cause the game to proceed with the selections. Not only do these features change the game outcome, they may also be operable to change the likelihood of winning. Thus, the presence and implementation of these features may change the odds of winning.

In certain embodiments, wins may be achieved from collections of icons or symbols in particular arrangements on the active array, for instance a block of matching icons or symbols. For instance, a win may be achieved if a block of nine adjacent similar or same icons or symbols appear on the display.

While the exemplary embodiment depicts a path having a particular arrangement, it can be appreciated by a person of skill in the art that the concepts are not limited to the use of this particular path and that any suitable arrangement for showing icons, symbols or balls moving along the screen would be suitable. For instance, it would be possible to use a path where the icons, symbols or balls moved primarily across the screen through a primarily vertical path with end sections connecting the top and bottom of the vertical columns.

The gaming system has been described above as a dedicated physical gaming machine such as might be provided in a casino or other establishment. Alternatively, the gaming machine may be a suitable computer or mobile device (smartphone, tablet, etc.) connected to a network or server via the internet and configured and programmed to carry out and provide the inventive concepts described herein. The gaming machine may be a screen image in a virtual casino. Icon selection may be by touch screen, a mouse, a joystick, keyboard or other input device. The gaming system may access a gaming site or a social website (e.g., Facebook) via the internet, wherein a remote gaming site controls various aspects of the game and allows remote players to participate in games using a virtual gaming machine. The player's inputs may be transmitted to a remote server and the results displayed to the display screen on the player's computer or mobile device. For example, a player's mobile computing system (e.g., a smartphone) may detect winning symbol combinations by signals from the server informing the computing system that a winning combination has occurred. Alternatively, the remote server may provide instructions to the player's mobile computing system regarding what should be displayed, for instance, a particular outcome. For gaming via the internet, the wagering may be by credit card or with an online account. Awarding the player may be by crediting the player's account. For portable computing devices, Near Field Communications (NFC), such as Bluetooth, or WiFi may be used by a player computing device to communicate with an actual or virtual gaming machine.

Accordingly, in some embodiments, one or more servers may be configured to perform at least some of the steps described in FIG. 3. For example, a server may be remotely connected with a client device such as a computer, mobile device or slot machine. The server includes a processing system (e.g. a processor) which is configured with processor-executable instructions which configure the processor to perform at least some of the steps described in FIG. 3 and the written disclosure provided herein. In at least some embodiments, the client device acts as a simple client in that it adopts a passive role by acting as an input mechanism and display device without performing all steps described in FIG. 3. Instead, some or all of the steps of may be performed by a remote or centralized server or controller. For example, checking for a trigger event, instructing the display on what to show and determining the game outcome may be performed by the server's processor, which communicates with the client device. Additionally, a remote or centralized server or controller may receive communications from a game terminal, for instance an indication from a player input that a player wishes to use a shuffle feature, the freeze feature, the wild feature, the freespins feature, the cascade feature, the nudge feature or a combination of these features or that the player wishes to make a wager or start a game. Responsive to receipt of such communications the remote or centralized server or controller is configured to cause the display to display appropriate action to the game player. In such embodiments, the server may then cause the client device to generate displays on the display system associated with the client device. For example, in at least some embodiments, the server may animate and control the movement and appearance of the icons and other features of the game, for instance the icons, symbols or balls (e.g., it may select the stopping position of the balls and thus the outcome of the game) and may provide instructions to the client device to instruct the client device to display corresponding display screens. Similarly, in some embodiments, the server may determine whether any of the additional features described herein might be triggered. Thus, the system and methods contemplated herein may make use of multiple computers each having processors and memory where the multiple computers are in communication with each other, for instance over a network, and may act in response to communications received from other computers on the network.

Additionally, the server may cause the display to show a virtual game play and outcome. For instance, the server may instruct the display to show virtual animation of symbols, icons or balls along a path. The server causes the display to animate the symbols, icons or balls along the path giving the display the appearance of a these items moving along a path. After the movement, the symbols, icons or balls stop and the actual game outcome is indicated by the stopped position and arrangement of the symbols, icons or balls on the display.

Accordingly, the server and the client device together form a multi-nodal system which may collectively perform the steps described with FIG. 3. In embodiments in which a server is used to perform many of the steps described in FIG. 3, the server may require a memory for storing game data, such as the replacement symbols.

Figure 6:
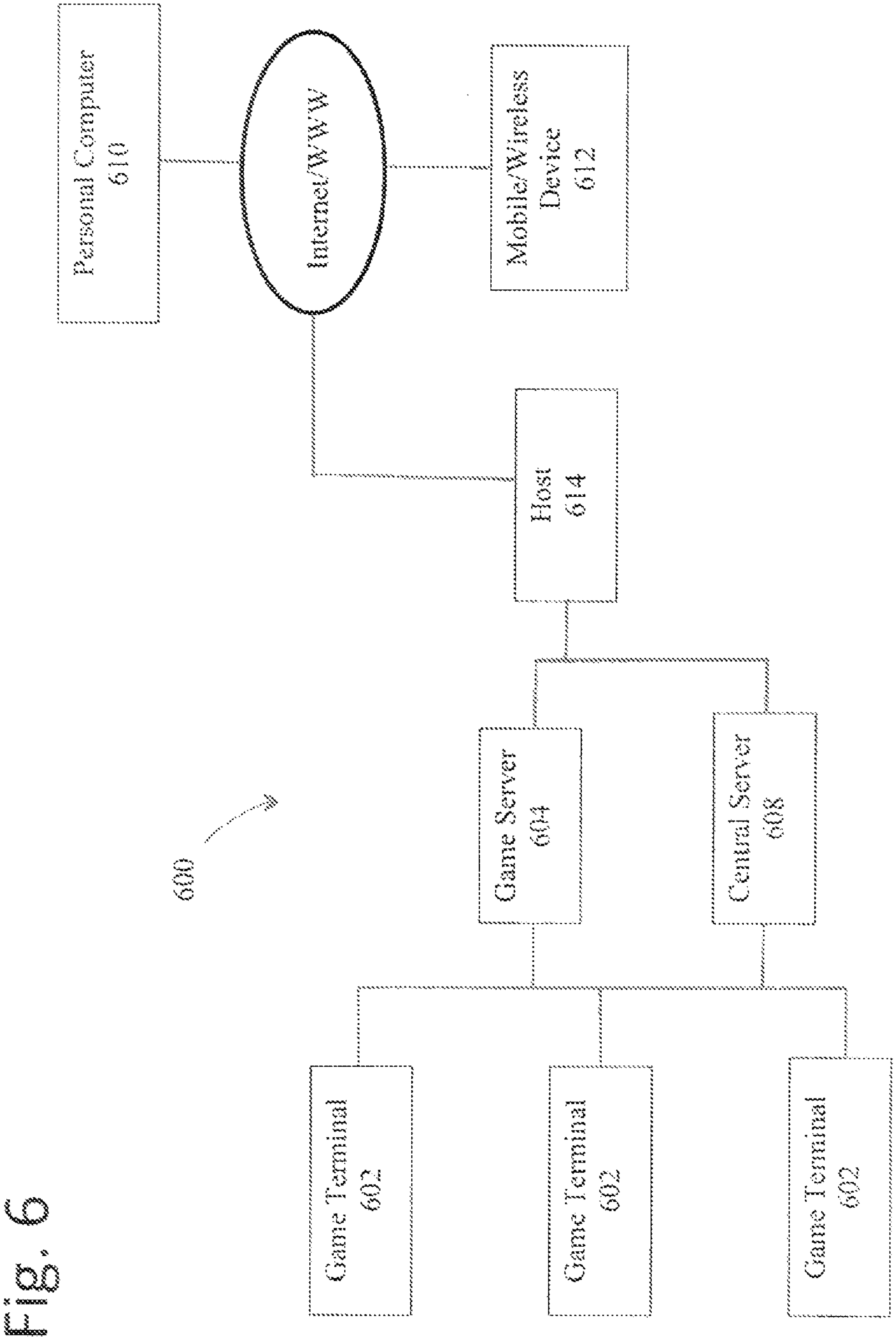
FIG. 6 shows a block diagram of an example network according to one embodiment.

FIG. 6 shows a block diagram of an example network according to one embodiment. The network includes one or more networked gaming machines 602 in accordance with one or more embodiments. While FIG. 6 shows some exemplary servers separately, these servers may be combined or divided among additional servers within the scope of the disclosure.

In one embodiment, game server 604 may provide server-based games and/or game services to network connected gaming machines 602 (which may be connected by network cable or wirelessly). Central server 608 may provide progressive game play (for instance a separate game funded by a percentage of wagers from eligible gaming devices 604 or receiving funding through other casino establishment funds) and provide progressive awards to winning gaming devices upon occurrence of a progressive event, such as a progressive jackpot game outcome or another suitable triggering event such as a random or pseudo-random win determination at a networked gaming device 602 or server 604. Additionally or alternatively, central server 608 may provide accounting functionality and receive gaming data from networked gaming machines 602, and possibly also perform audit functions.

Central server 608 may also track and maintain player account records, and store player data such as player points and/or player preferences.

In one embodiment the game may be provided via the Internet or World Wide Web via a gaming website that can be accessed by a player device such as a personal computer 610 or handheld wireless device 612 (e.g. a mobile phone, smartphone, notepad or notebook computer). A player may log in to the gaming website and play various games on the website.

A host computer or server 614 may be configured and operable to connect the game server 604 to the Internet or World Wide Web.

Those skilled in the art may write the appropriate software to carry out the invention without undue experimentation.

The term "random" used herein refers to pure random as well as pseudo-random.

While particular embodiments of the present invention have been shown and described, it will be appreciated by those skilled in the art that changes and modifications may be made without departing from this invention in its broader aspects and, therefore, the appended claims are to encompass within their scope all such changes and modifications as fall within the true spirit and scope of this invention. Any of the features described herein may be combined into a game.

What is claimed is:

1. A video gaming system comprising:

a display for displaying a wagering game;

a wager input device that is configured to read an instrument supplied by a player for conveying a monetary amount;

a player input device to receive player selections;

a memory;

a programmed controller, the controller being coupled with the memory and the display, the controller configured to:

cause the display to show a plurality of icons on the display screen, wherein the plurality of icons are displayed so that they appear in different positions along a predefined curving path, wherein the predefined curving path comprises defined ends thereof and wherein the predefined curving path comprises a first active region, a second active region and an inactive region arranged so that ones of the plurality of icons move from the first active region to the inactive region and then to the second active region;

receive, from the player input device, an indication of a desire to play the game;

animate the display to show the plurality of icons moving along the predefined curving path;

in response to a stop event, stop the animation of the display showing the movement of the plurality of icons along the path;

determine whether the plurality of icons are arranged to provide a player a win; and communicate an award associated with a winning pay line to a player.

2. The system of claim 1, wherein the stop event is selected from the group consisting of: a predetermined number of icons entering the display; a predetermined duration of time passing; a randomly determined number of icons entering the display; a randomly determined duration of time passing; and receipt of a player input.

3. The system of claim 1, wherein the controller is configured to cause the display to show the plurality of icons moving along the predefined curving path a predetermined distance within a given period of time.

4. The system of claim 1, wherein the controller is configured to cause the display to show the predefined curving path as a set of horizontal segments arranged vertically in the form of a stack and the segments each have at least one side end connected to at least one adjacent horizontal segment.

5. The system of claim 4, wherein at the top of the stack the predefined curving path has an end that is connected to an entry point.

6. The system of claim 5, wherein the entry point is at a top side of the display screen.

7. The system of claim 4, wherein at the bottom of the stack the path has an end that is connected to an exit point.

8. The system of claim 7, wherein the exit point is at a bottom side of the display screen.

9. The system of claim 1, wherein the controller communicates the award by displaying a message or animation showing the player an award.

10. The system of claim 1, wherein the award reflects a value dependent at least in part based upon the icons appearing in the winning payline.

11. The system of claim 1, wherein the controller is configured to cause the display to show the plurality of icons moving along the predefined curving path a randomly determined distance within a given period of time.

12. The system of claim 1, wherein the controller causes the display to show that each of the plurality of icons moves in one of three different directions.

13. The system of claim 12, wherein the three different directions are towards the left side of the display screen, towards the right side of the display screen and towards the bottom side of the display screen.

14. The system of claim 1, further comprising a shuffle feature wherein the controller is configured to determine new locations for one or more of the icons on the screen and to cause the display to show the icons in the new locations.

15. The system of claim 14, wherein the shuffle feature is triggered randomly or in response to a player instruction.

16. The system of claim 1, wherein a freeze feature is provided wherein in response to a player instruction, the controller causes one or more of the icons on the screen to be held in position on the screen.

17. The system of claim 1, wherein one or more icons on the screen serves as a wild that can serve as any icon to form a winning combination.

18. The system of claim 1, wherein a turbo feature is provided wherein the controller accelerates the movement of the icons on the display screen.

19. The system of claim 1, wherein a slow feature is provided wherein the controller slows down the movement of the icons on the display screen.

20. The system of claim 1, further comprising a free spins feature where the controller provides a player a number of free spins.

21. The system of claim 1, wherein a cascade feature is provided to remove all of the icons of a particular type, for instance, a particular color or shape, and new icons and the remaining icons fill in the resulting gaps along the predefined curving path.

22. The system of claim 1, wherein the controller is configured to randomly determine an award to be associated with the game.

23. The system of claim 1, wherein the controller is configured to receive an indication of an outcome for the game.

24. The system of claim 1, wherein the award is selected from the group consisting of: a multiplier, a prize amount, one or more game credits, and one or more free spins.

25. The system of claim 1, further comprising a wager input device for receiving a wager.

26. The system of claim 1, wherein each round of the game is provided with a single predefined curving path.

27. The system of claim 1, wherein each round of the game is provided with a single predefined curving path that is shaped differently from the predefined curving path from the preceding round of the game.

28. The system of claim 1, wherein the predefined curving path is sized to allow only one icon to pass along a given point in the predefined curving path at any time.

29. The system of claim 1, wherein the controller is further configured to cause the display to:

display over the predefined curving path a plurality of potential pay lines; and highlight at least one pay line showing a winning combination of icons.

30. The system of claim 1, wherein the display screen is a touch sensitive display screen and the player input is received at the touch sensitive display screen.

31. The system of claim 1, wherein the display is provided with an active region and one or more inactive regions arranged so that as some of the icons move along the path they move from the active region to an inactive region.

32. A system comprising:

a client device including a display and a player input device; and a server in communication with the client device, the server including a memory and a processing system coupled with the memory, the processing system configured to:

cause the display to show a plurality of icons on the display screen, wherein the plurality of icons are displayed so that they appear in different positions along a predefined curving path, wherein the predefined curving path comprises defined ends thereof and wherein the predefined curving path comprises a first active region, a second active region and an inactive region arranged so that ones of the plurality of icons move from the first active region to the inactive region and then to the second active region;

receive, from the player input device, an indication of a desire to play the game;

animate the display to show the plurality of icons moving along the predefined curving path;

in response to a stop event, stop the animation of the display showing the movement of the plurality of icons along the path;

determine whether the plurality of icons are arranged to provide a player a win; and communicate an award associated with a winning payline appearing in the icon arrangement presented on the screen to a player.

* * * * *